United States Patent
Medina, III

(10) Patent No.: US 11,514,548 B1
(45) Date of Patent: Nov. 29, 2022

(54) MACHINE-LEARNING FOR ENHANCED MACHINE READING OF NON-IDEAL CAPTURE CONDITIONS

(71) Applicant: United Services Automobile Association (USAA), San Antonio, TX (US)

(72) Inventor: Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 201 days.

(21) Appl. No.: 16/679,833

(22) Filed: Nov. 11, 2019

Related U.S. Application Data

(63) Continuation of application No. 15/716,806, filed on Sep. 27, 2017, now Pat. No. 10,521,878.

(51) Int. Cl.
| | |
|---|---|
| *G06F 16/51* | (2019.01) |
| *G06T 5/00* | (2006.01) |
| *G06T 1/20* | (2006.01) |
| *G06N 20/00* | (2019.01) |

(52) U.S. Cl.
CPC .......... *G06T 1/20* (2013.01); *G06F 16/51* (2019.01); *G06N 20/00* (2019.01); *G06T 5/001* (2013.01); *G06T 2207/20024* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 8,977,627 B1 | 3/2015 | Vijayanarasimhan et al. | |
| 10,521,878 B1* | 12/2019 | Medina, III | G06T 1/20 |
| 2010/0098318 A1* | 4/2010 | Anderson | G06Q 40/12 |
| | | | 382/137 |
| 2012/0240224 A1 | 9/2012 | Payne et al. | |
| 2013/0321675 A1* | 12/2013 | Cote | H04N 9/646 |
| | | | 348/242 |
| 2014/0267770 A1 | 9/2014 | Gervautz et al. | |
| 2015/0220806 A1 | 8/2015 | Heller et al. | |
| 2017/0206632 A1 | 7/2017 | Milanfar et al. | |

OTHER PUBLICATIONS

Dean, T.—"Fast, Accurate Detection of 100,000 Object Classes on a Single Machine"—CVPR2013—2013—pp. 1814-1821 (Year: 2013).*
Suleiman, A.—"Energy-Efficient HOG-based Object Detection at 1080HD 60 fps with Multi-Scale Support"—ResearchGate 2014, pp. 256-261 (Year: 2014).*
Felzenszwalb, P.—"A Discriminatively Trained, Multiscale, Deformable Part Model"—IEEE 2008, pp. 1-8 (Year: 2008).*

* cited by examiner

*Primary Examiner* — Bernard Krasnic
(74) *Attorney, Agent, or Firm* — Fish & Richardson P.C.

(57) ABSTRACT

Implementations of the present disclosure include receiving a training image, providing a hash pattern that is representative of the training image, applying a plurality of filters to the training image to provide a respective plurality of filtered training images, identifying a filter to be associated with the hash pattern based on the plurality of filtered training images, and storing a mapping of the filter to the hash pattern within a set of mapping in a data store.

17 Claims, 4 Drawing Sheets

MACHINE-LEARNING FOR ENHANCED MACHINE READING OF NON-IDEAL CAPTURE CONDITIONS

CROSS-REFERENCE TO RELATED APPLICATION

This application is a continuation application of and claims priority to U.S. application Ser. No. 15/716,806, filed on Sep. 27, 2017, the entire contents of which is incorporated herein by reference.

BACKGROUND

Technological advancement has enabled physical documents to be converted to digital files, and data recorded in the physical documents to be captured as digital data. Such digital files can be used to facilitate transactions. For example, remote deposit capture (RDC) enables a user to capture an image of a negotiable instrument, such as a check, to provide a digital file (e.g., image file), which can be used to deposit the negotiable instrument at a financial institution. Transaction data can be determined from the digital file, which can be used to provide information required to complete the deposit.

Capture of the physical document to a digital file can be imperfect, which can frustrate subsequent handling of the digital file. For example, a user can use a device (e.g., a smartphone) to capture an image (recorded in a digital file) of a negotiable instrument. If the negotiable instrument is not properly aligned, the image is blurry, and/or the lighting insufficient, it may not be possible to accurately and/or efficiently determine transaction data. Consequently, the digital image may be rejected, and another image required. This is not only detrimental to the user's experience (e.g., frustrating users), it results in inefficiencies with respect to the underlying resources (e.g., processors, memory, communication bandwidth), as processes need be repeated.

SUMMARY

This specification relates to automatically applying a filter of a plurality of filters to an image to enable processing of the image for determining data captured in the image.

In general, innovative aspects of the subject matter described in this specification can be embodied in methods that include actions of receiving a training image, providing a hash pattern that is representative of the training image, applying a plurality of filters to the training image to provide a respective plurality of filtered training images, identifying a filter to be associated with the hash pattern based on the plurality of filtered training images, and storing a mapping of the filter to the hash pattern within a set of mapping in a data store. Other implementations of this aspect include corresponding systems, apparatus, and computer programs, configured to perform the actions of the methods, encoded on computer storage devices.

These and other implementations can each optionally include one or more of the following features: the hash pattern includes a binary string; the hash pattern is at least partially provided by one or more of providing a micro-image, applying a convolution edge filter to the micro-image, and applying bi-level encoding to the micro-image; identifying a filter to be associated with the hash pattern includes determining respective accuracies of data read from each of the filtered images, identifying a filtered image as having the highest accuracy of data read, the filtered image having been provided from the training image, and associating the filter used to provide the filtered image to the hash pattern of the training image; actions further include receiving a transaction image captured by a computing device, the transaction image representing a document to be used in executing a transaction, providing a transaction hash pattern for the transaction image, identifying the filter as to be applied to the transaction image based on the mapping, providing a filtered transaction image using the filter, and determining data from the filtered transaction image, the data being used to execute the transaction; identifying the filter as to be applied to the transaction image based on the mapping includes determining that the transaction hash pattern sufficiently matches the hash pattern mapped to the filter; determining that the transaction hash pattern sufficiently matches the hash pattern mapped to the filter includes calculating a Hamming distance between the transaction hash pattern and the hash pattern, and comparing the Hamming distance to a threshold Hamming distance; determining data is performed by optical character recognition (OCR) of the filtered transaction image; the document includes a negotiable instrument; actions further include receiving a transaction image captured by a computing device, the transaction image representing a document to be used in executing a transaction, providing a transaction hash pattern for the transaction image, and determining that the transaction hash pattern does not correspond to any mapping in set of mapping, and in response, transmitting a notification to a user device that provided the transaction image, the notification providing instructions to capture another transaction image.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to automatically applying filters to images using a machine-learned model. More particularly, implementations of the present disclosure are directed to automatically applying a filter of a plurality of filters to an image to enable processing of the image for determining data captured in the image. In some implementations, actions include receiving a training image, providing a hash pattern that is representative of the training image, applying a plurality of filters to the training image to provide a respective plurality of filtered training images, identifying a filter to be associated with the hash pattern based on the plurality of filtered training images, and storing a mapping of the filter to the hash pattern within a set of mapping in a data store.

Implementations of the present disclosure are described in further detail herein with reference to an example context. The example context includes remote deposit capture (RDC), which enables a user to capture an image of a negotiable instrument, such as a check, to provide a digital file (e.g., image file), which can be used to deposit the negotiable instrument at a financial institution. It is contemplated, however, that implementations of the present disclosure can be realized in any appropriate context.

Figure 1:
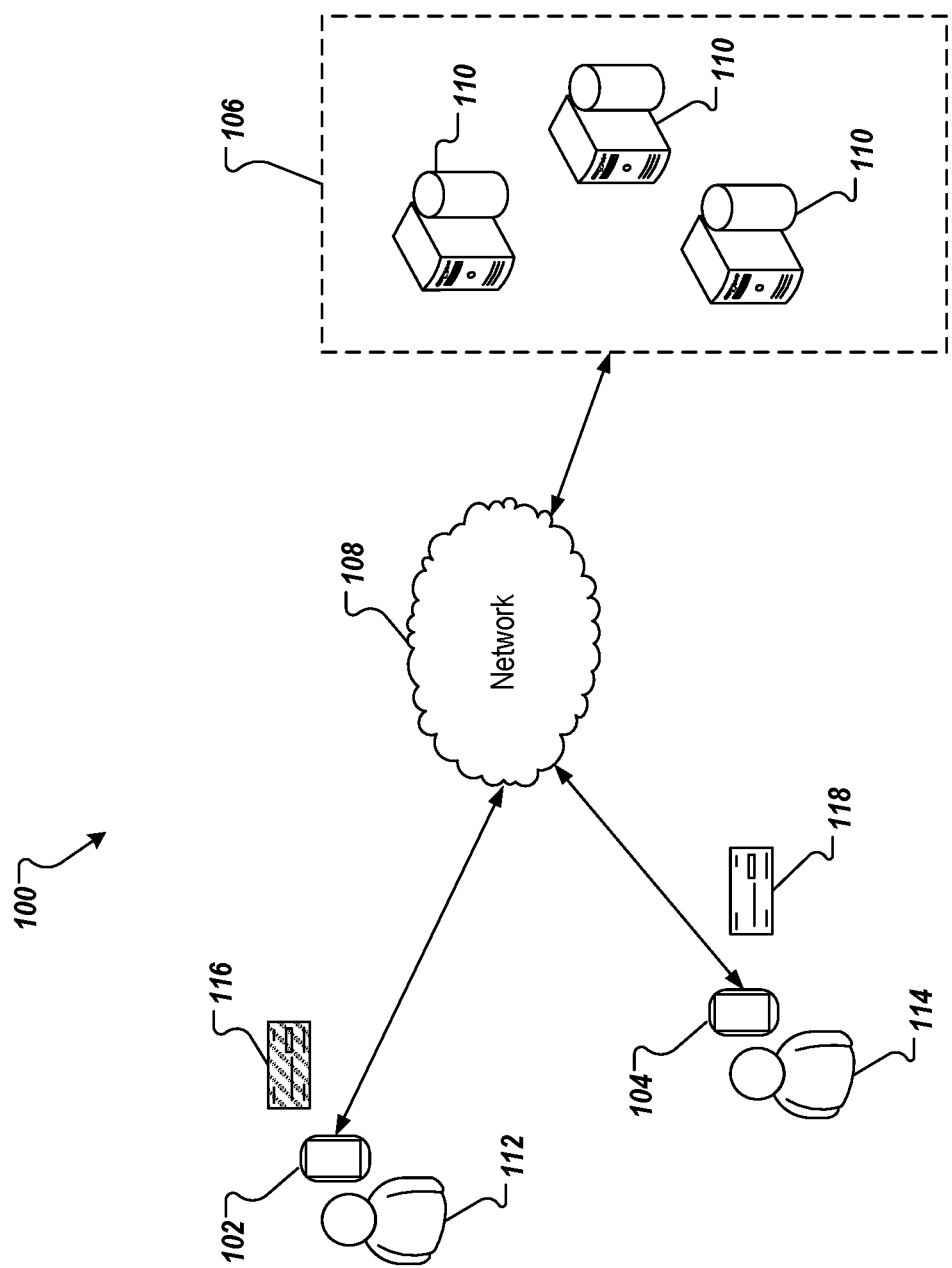
FIG. 1 depicts an example environment that can be used to execute implementations of the present disclosure.

FIG. 1 depicts an example environment 100 that can be used to execute implementations of the present disclosure. In some examples, the example environment 100 enables images to be processed, and filters selectively applied thereto, as described in further detail herein. In some examples, and in accordance with the example context, the example environment 100 enables users to perform RDC. The example environment 100 includes computing devices 102, 104, a back-end system 106, and a network 108. In some examples, the computing devices 102, 104 are used by respective users 112, 114 to log into and interact with the back-end system 106 over the network 108, and participate in RDC.

In the depicted example, the computing devices 102, 104 are provided as mobile computing devices. It is contemplated, however, that implementations of the present disclosure can be realized with any appropriate computing device (e.g., smartphone, tablet, laptop computer, voice enabled devices). In some examples, the network 108 includes a local area network (LAN), wide area network (WAN), the Internet, or a combination thereof, and connects web sites, user devices (e.g., computing devices 102, 104), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 110. In some examples, the at least one server system 110 hosts one or more computer-implemented services that users can interact with using computing devices. For example, the computing devices 102, 104 can be used to communicate with a service hosted by the back-end system 106 over the network 108. In some examples, the computing devices 102, 104 each includes a computer-executable application executed thereon, which can be used to log into the service and establish a communication session between the computing device 102, 104 and the back-end system 106. In some examples, the computing devices 102, 104 each includes a web browser application executed thereon, which can be used to display one or more web pages of the service, the user interacting with the service through the web page(s).

In accordance with implementations of the present disclosure, users can capture images of documents, which images can be processed to determine data recorded on the documents. In the example context, a document can include a negotiable instrument, such as a check. For example, in FIG. 1, documents 116, 118 are depicted. In the example of FIG. 1, the user 112 uses the computing device 102 to capture an image of the document 116, and the user 114 uses the computing device 104 to capture an image of the document 118. In the depicted example, the image of the document 116 is captured in a lighting condition that results in a shadow, or multiple shadows being case over the document 116.

Figure 2:
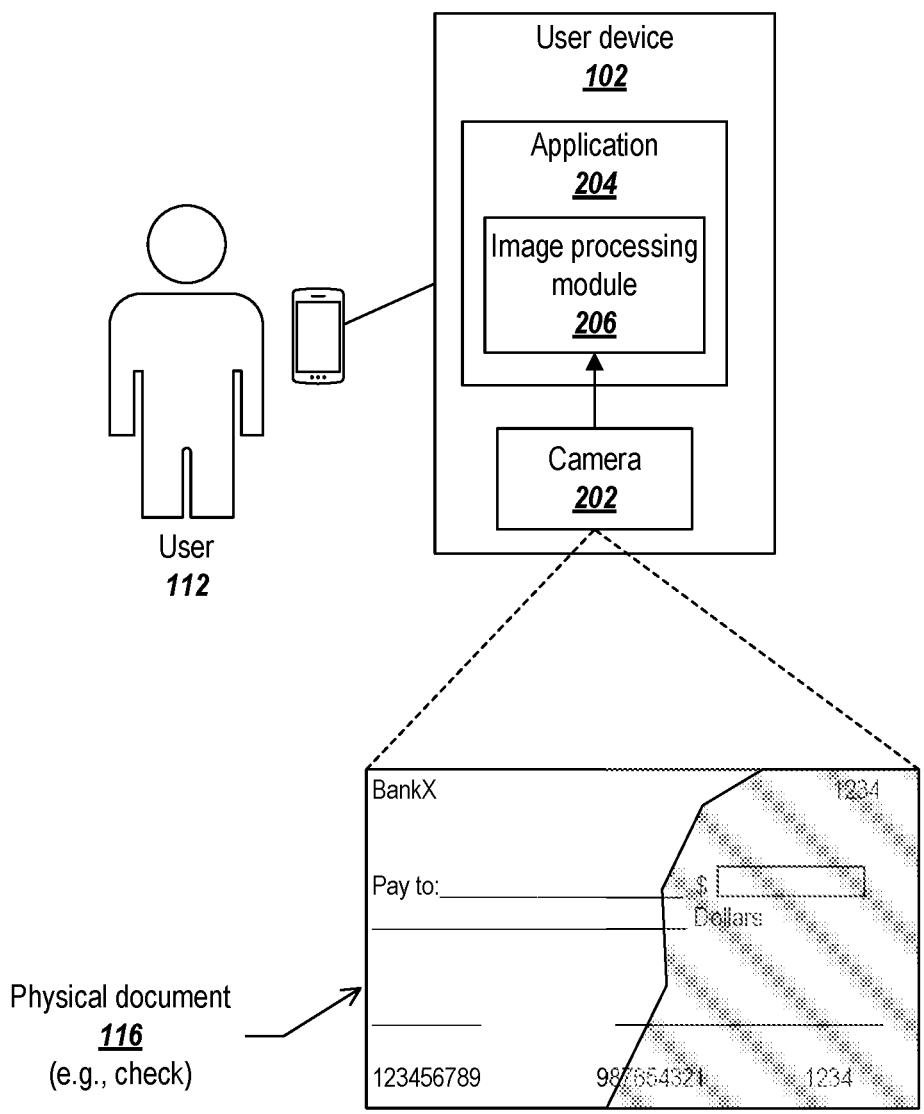
FIG. 2 depicts an example capture of a physical negotiable instrument.

FIG. 2 depicts an example of use of the computing device 102 to perform RDC in accordance with the example context. In some examples, the computing device 102 includes one or more scanning components. In the depicted example, the computing device 102 includes a scanning component that is an image capture device such as a camera 202. Implementations of the present disclosure also support the use of appropriate scanning components to scan physical documents, or other physical objects, to provide a respective image. The camera 202 may be configured to capture still images and/or video data. An application 204 is executed by the computing device 102, and, in the depicted example, includes an image processing module 206. In some examples, the application can be used to conduct RDC based on an image (e.g., of the physical negotiable instrument 116). For example, the application 204 may instruct the camera 202 to generate one or more images, or video data, of the physical document 116. Such image, and/or video data may be analyzed by the image processing module 206 in accordance with implementations of the present disclosure. In some examples, such image, and/or video data is provided to a back-end system (e.g., the back-end system 106) for processing in accordance with implementations of the present disclosure.

In accordance with implementations of the present disclosure, a machine-learned model is provided to selectively apply one or more filters to images. More specifically, the machine-learned model is used to select at least one filter to be applied to the image to provide a filtered image, which can be processed (e.g., using optical character recognition (OCR), and/or a machine-readable code reader) to determine data recorded in the document. In accordance with the example context, an image of a document is processed to determine the account information, such as the account number, routing transit number, institution (e.g., bank) name, user name, and so forth, and payment information, such as the recipient, date, memo, and an amount. The account information and the payment information can be determined using any appropriate technique (e.g., OCR) to determine text data from the image. In some examples, a document can record other information, such as a machine-readable code (e.g., barcode, QR code), which can be determined from the image, and decoded to provide information encoded in the machine-readable code.

In some examples, a quality of the image may be poor due to, for example, lighting conditions in the environment, within which the image is captured. For example, and as depicted in FIG. 2, the document 116 can be wholly, or partially shadowed, resulting in a relatively reduced quality of the image, and/or inconsistent quality across the image. In some examples, this can lead to inability to efficiently, and/or accurately determine data recorded in the document using the image. Implementations of the present disclosure, apply the at least one filter to improve the quality of the image for determining data from the image.

In accordance with implementations of the present disclosure, the machine-learned model is provided based on training data. In some examples, the machine-learned model is provided as a mapping of hash patterns to filters. In some examples, the training data includes images of documents (training images), from which data is to be determined. In some examples, the training images are recorded in various lighting conditions. In some examples, each training image is a cropped image of the document. In some implementations, a hash pattern is determined for each training image. In some examples, the hash pattern can be provided by multi-step processing of the image. An example multi-step processing includes providing a micro-image, applying a convolution edge filter to the micro-image, applying bi-level encoding to the micro-image, and generating the hash pattern as a binary string.

In some examples, the micro-image is provided by scaling the image. Any appropriate image scaling technique can be utilized to provide the micro-image. Example image scaling techniques include, without limitation, nearest neighbor, bilinear interpolation, bicubic interpolation, sinc resampling, box sampling, and mipmap.

In some examples, a convolution edge filter is applied to the micro-image to detect edges of objects within the micro-image. Example objects can include text, lines, graphics, machine-readable codes, and the like. In some examples, filtering using a convolution edge filter can include a convolution neural network (CNN) that includes multiple filters (referred to as kernels). In some examples, a 3 column by 3 row mask is used in the convolution edge filtering. Convolution edge filtering is known in the art. Consequently, a more detailed discussion is presently foregoing.

In some examples, bi-level encoding is applied to the micro-image to provide a digital representation of the micro-image. For example, each pixel of the micro-image is encoded as either a one (1) or a zero (0) (e.g., 1 indicates a light pixel, 0 indicates a dark pixel). In this manner, the micro-image is represented as a digital matrix. In some examples, the hash pattern is provided based on the digital matrix, and includes a binary string. In some examples, the binary string is provided as a predefined number of bits (e.g., 13-bits). In some implementations, the hash pattern is provided by hashing the digital matrix using a hash function. For example, a first image can be processed to provide a first hash pattern (e.g., 0110111110111), and a second image can be processed to provide a second hash pattern (e.g., 0001111110111).

In some implementations, the hash patterns are clustered to provide a plurality of clusters. In some examples, each cluster represents a unique hash pattern relative to hash patterns of other clusters. In some examples, hash patterns are clustered based on Hamming distances between hash patterns. A Hamming distance can be described as the number of positions at which the corresponding bits of the hash patterns are different. Using the first hash pattern and the second hash pattern as examples, the Hamming distance therebetween can be provided as three (3). In some examples, the Hamming distance can be compared to a threshold Hamming difference. If the Hamming distance exceeds the threshold Hamming distance, the hash patterns are determined to be sufficiently dissimilar, and are distributed to different clusters. If the Hamming distance does not exceed the threshold Hamming distance, the hash patterns are determined to be sufficiently similar, and are included in the same cluster.

In accordance with implementations of the present disclosure, each filter of a plurality of filters is applied to a training image to provide respective filtered images. Example filters can include image binarization, which segments the pixels into black or white. In some examples, image binarization techniques include, without limitation, image otsu thresholding, image convolution with a targeted kernel, binary image quantization, canny edge detectors, and sobel detectors.

In some examples, each filtered image is processed to read data therefrom. In some examples, a quality of the data read from each filtered image (binarized image) is determined, and each filer (binarization method) is scored for the respective training image. For example, for a first training image, each filter of the plurality of filters is applied to provide a first set of filtered images. Each filtered image in the first set of filtered images is processed to read data therefrom. The data read from each filtered image is compared to groundtruth data that is known for the training image to determine an accuracy of the data read from the image. For example, if all of the data read from the filtered image matches all of the groundtruth data, the data read for the filtered image can be determined to be wholly accurate (e.g., 100% accurate). However, if only a portion of the data read from the filtered image matches the groundtruth data, the data read from the filtered image can be determined to be partially accurate (e.g., less than 100% accurate). Accordingly, for each training image, and respective hash pattern, the filters of the plurality of filters can be ranked based on accuracy. In this manner, which filter provides the most accuracy for a respective training image, and thus its lighting condition, can be determined.

In some implementations, evaluation of the filters is performed for a representative training image based on the clusters. For example, and as described above, hash patterns can be clustered based on Hamming distances. In some examples, a representative hash pattern can be selected for a cluster, the representative hash pattern corresponding to a training image, from which the representative hash pattern was derived. The training image can be provided as the representative training image, and the filter evaluation can be performed based thereon. In this manner, a filter can be determined as providing the most accuracy for a respective representative training image, and corresponding cluster.

In some implementations, a mapping is provided, which maps the filter to the hash pattern of the respective training image. For example, for a (representative) training image, its corresponding hash value is mapped to the binarization (filter) that provided the most accurate data reading results for the training image. In some implementations, it can be determined that, for a training image, no filter is adequate for providing sufficient data read accuracy. In such instances, the hash pattern of the training image can be included, and the mapping to a filter can be left blank. This can indicate that, for the particular training image, and thus, its respective lighting conditions, no filter is available. As described in further detail herein, the mappings can be used to provide real-time analysis, and/or feedback regarding images that are captured.

Implementations of the present disclosure are described in further detail herein with reference to example use cases. Referring again to FIG. 1, the user 112 can use the computing device 102 to capture an image of the document 116 o perform a transaction (e.g., deposit). Accordingly, the image captured by the computing device 102 can be referred to as a transaction image. As depicted in FIG. 1, lighting conditions of the document 116 are not optimal, and the document 116 is shadowed. In some examples, the image is processed to provide a hash pattern, which can be referred to as a transaction hash pattern (e.g., provided using the example multi-step process described above). In some examples, the hash pattern is compared to hash patterns included in the mappings. For example, a Hamming distance can be determined between the (transaction) hash pattern, and each of one or more hash patterns included in the mappings. In some examples, if the Hamming distance is below a threshold Hamming distance, the corresponding mapping entry is referenced, and the filter that is mapped is selected. The selected filter is applied to the image to provide a filtered image, which is used to determine the data recorded in the filtered image (e.g., using OCR). In some examples, if multiple Hamming distances are below the threshold Hamming distance, the mapping entry corresponding to the lowest Hamming distance is referenced. In some examples, if no filter is mapped in the referenced mapping entry, an error can be indicated. For example, an error message can be displayed to the user 112 on the computing device 102 requesting that the user 112 capture another image under improved lighting conditions.

Figure 3:
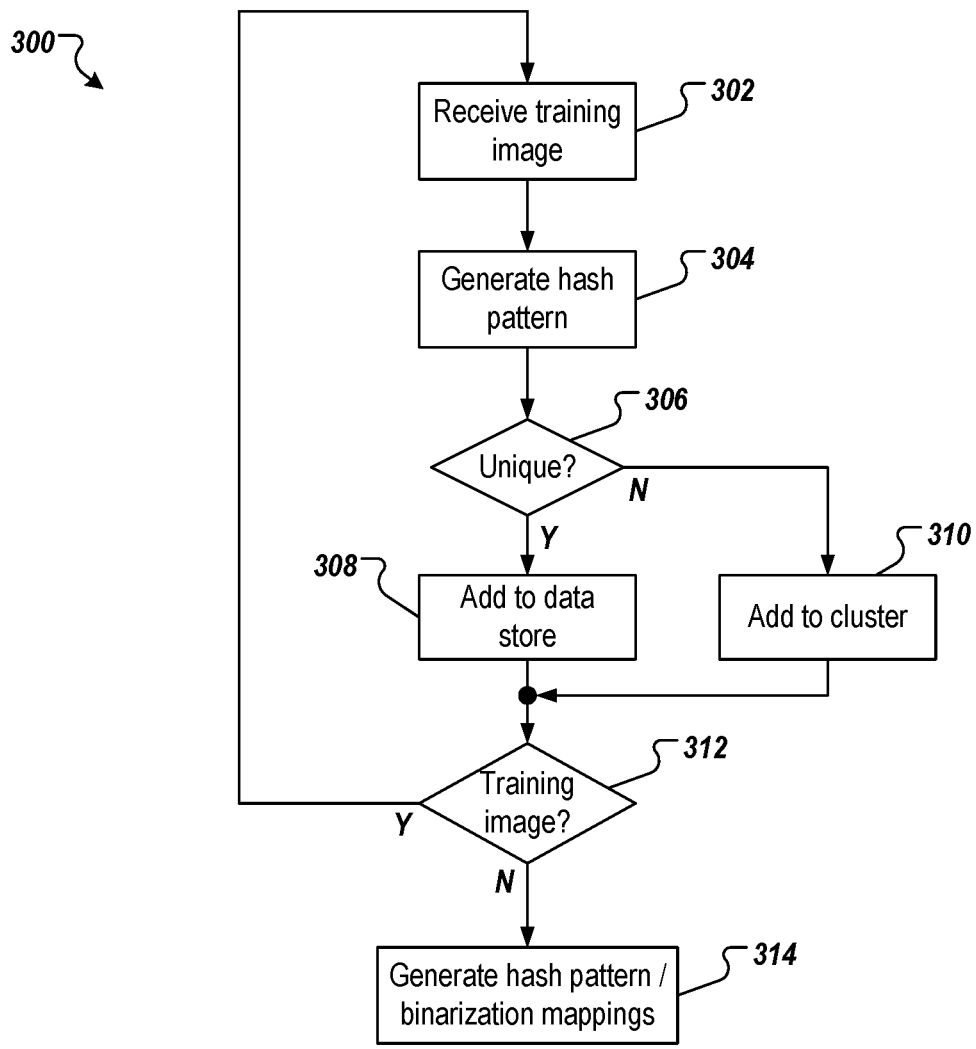
FIG. 3 depicts an example process that can be executed in accordance with implementations of the present disclosure.

FIG. 3 depicts an example process 300 that can be executed in accordance with implementations of the present disclosure. The example process 300 can be provided by one or more computer-executable programs executed by one or more computing devices. In some examples, the example process 300 can be performed to sort training images for subsequent mappings of hash patterns to binarizations (filters).

A training image is received (302). For example, a training image of a set of training images is received. A hash pattern is generated (304). For example, a hash pattern is generated for the training image based on the example multi-step process described herein. It is determined whether the hash pattern is unique (306). For example, the hash pattern is compared to one or more other hash patterns provided for respective training images. In some examples, and as described herein, respective Hamming distances can be determined between the hash pattern, and each of the one or more other hash patterns. If the Hamming distances all exceed the threshold Hamming distance, the hash pattern is determined to be unique. If a Hamming distance does not exceed the threshold Hamming distance for one of the one or more other hash patterns, the hash pattern is determined to be non-unique. If the hash pattern is unique, the hash pattern is added to the data store as a mapping entry (308). If the hash pattern is not unique, the hash pattern is added to a cluster that is already represented by an entry in the data store (310). It is determined whether all training images have been processed (312). If all training images have not been processed, the example process 300 loops back to review another training image. If all training images have been processed hash pattern to filter mappings are generated (314).

Figure 4:
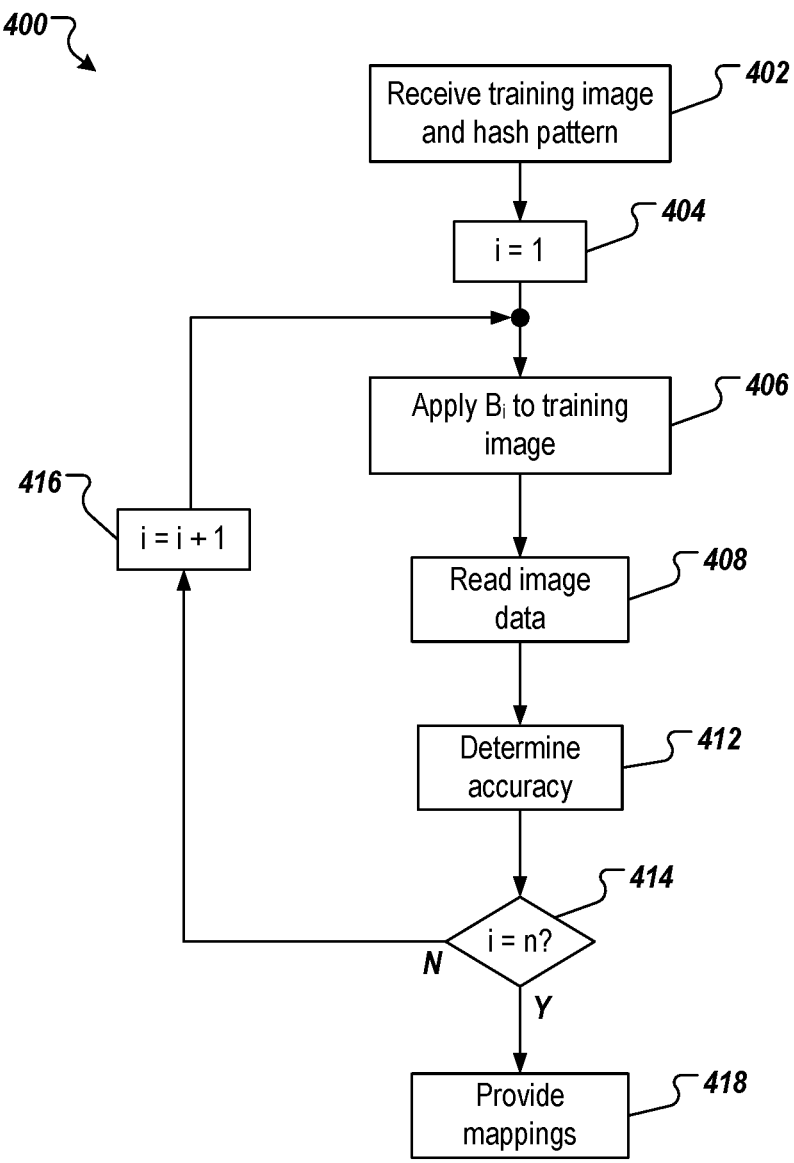
FIG. 4 depicts an example process that can be executed in accordance with implementations of the present disclosure.

FIG. 4 depicts an example process 400 that can be executed in accordance with implementations of the present disclosure. The example process 400 can be provided by one or more computer-executable programs executed by one or more computing devices. The examples process 400 can be executed to determine the best filter for a respective training image, and map the filter to the hash pattern of the training image within a set of mappings.

A training image and its respective hash pattern are received (402). In some examples, the training image is a representative training image of a cluster (e.g., the respective hash pattern being a representative hash pattern of the cluster). A counter i is set equal to 1 (404). A filter (e.g., binarization $B_i$ in a set of binarizations $B_1, \ldots B_n$) is applied to the training image to provide a filtered training image (406). Data is read from the filtered image (408). For example, OCR is used to read data from the filtered image. As another example, a machine-readable code reader is used to read data from a machine-readable code represented in the filtered image. An accuracy of the data read form the filtered image is determined (412). For example, the data read form the filtered image is compared to groundtruth data that is known for the training image, from which the filtered image was provided, and an accuracy value is determined (e.g., between 0% and 100%).

It is determined whether the counter i is equal to n (414). That is, it is determined whether all filters have been evaluated for the received training image. If the counter i is not equal to n, the counter i is incremented (416), and the example process 400 loops back. If the counter i is equal to n, a mapping of the hash pattern to a filter is provided for the training image (418). For example, the filter having the highest accuracy value for the training image is identified, and is mapped to the hash pattern of the training image within a set of mappings. In some examples, the example process 400 is performed for each training image (or each representative training image with respect to clusters) to provide multiple mappings in the set of mappings.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results.

In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:

maintaining a mapping of filters to hash patterns in a data store;
receiving a transaction image captured by a computing device, the transaction image representing a document to be used in executing a transaction;
processing the transaction image to generate a transaction hash pattern for the entire transaction image, comprising:
scaling the transaction image that represents the document by using at least one of the following scaling techniques: sinc resampling, box sampling, or mipmap to generate a micro-image of the transaction image,
applying a convolution edge filter to the micro-image generated by scaling the transaction image to generate a filtered micro-image, wherein the filtered micro-image includes one or more edges of one or more objects within the micro-image, and wherein the one or more objects include text,
applying bi-level encoding to the filtered micro-image to generate an encoded micro-image, and
generating the transaction hash pattern from the entire encoded micro-image;
identifying a first filter to be applied to the transaction image based on the mapping, wherein identifying the first filter to be applied to the transaction image based on the mapping comprises determining that the transaction hash pattern sufficiently matches a first hash pattern mapped to the first filter;
providing a filtered transaction image using the first filter;
determining text data from the filtered transaction image; and
executing the transaction with the determined text data from the filtered transaction image.

2. The method of claim 1, wherein the transaction hash pattern comprises a binary string.

3. The method of claim 1, wherein determining that the transaction hash pattern sufficiently matches the first hash pattern mapped to the first filter comprises calculating a Hamming distance between the transaction hash pattern and the first hash pattern, and comparing the Hamming distance to a threshold Hamming distance.

4. The method of claim 1, wherein determining text data is performed by optical character recognition (OCR) of the filtered transaction image.

5. The method of claim 1, wherein the document comprises a negotiable instrument.

6. The method of claim 5, wherein the transaction is to deposit the negotiable instrument at a financial institution.

7. A system comprising:
a data store for storing data; and
at least one processor configured to interact with the data store, the at least one processor being further configured to execute computer-readable instructions to perform operations comprising:
maintaining a mapping of filters to hash patterns in a data store;
receiving a transaction image captured by a computing device, the transaction image representing a document to be used in executing a transaction;
processing the transaction image to generate a transaction hash pattern for the entire transaction image, comprising:
scaling the transaction image that represents the document by using at least one of the following scaling techniques: sinc resampling, box sampling, or mipmap to generate a micro-image of the transaction image,
applying a convolution edge filter to the micro-image generated by scaling the transaction image to generate a filtered micro-image, wherein the filtered micro-image includes one or more edges of one or more objects within the micro-image, and wherein the one or more objects include text,
applying bi-level encoding to the filtered micro-image to generate an encoded micro-image, and
generating the transaction hash pattern from the entire encoded micro-image;
identifying a first filter to be applied to the transaction image based on the mapping, wherein identifying the first filter to be applied to the transaction image based on the mapping comprises determining that the transaction hash pattern sufficiently matches a first hash pattern mapped to the first filter;
providing a filtered transaction image using the first filter;
determining text data from the filtered transaction image; and
executing the transaction with the determined text data from the filtered transaction image.

8. The system of claim 7, wherein the transaction hash pattern comprises a binary string.

9. The system of claim 7, wherein the operations for determining that the transaction hash pattern sufficiently matches the first hash pattern mapped to the first filter comprise calculating a Hamming distance between the transaction hash pattern and the first hash pattern, and comparing the Hamming distance to a threshold Hamming distance.

10. The system of claim 7, wherein determining text data is performed by optical character recognition (OCR) of the filtered transaction image.

11. The system of claim 7, wherein the document comprises a negotiable instrument.

12. The system of claim 11, wherein the transaction is to deposit the negotiable instrument at a financial institution.

13. A non-transitory computer-readable storage medium coupled to one or more processors and having instructions stored thereon which, when executed by the one or more processors, cause the one or more processors to perform operations comprising:
maintaining a mapping of filters to hash patterns in a data store;
receiving a transaction image captured by a computing device, the transaction image representing a document to be used in executing a transaction;
processing the transaction image to generate a transaction hash pattern for the entire transaction image, comprising:
scaling the transaction image that represents the document by using at least one of the following scaling techniques: sinc resampling, box sampling, or mipmap to generate a micro-image of the transaction image,
applying a convolution edge filter to the micro-image generated by scaling the transaction image to generate a filtered micro-image, wherein the filtered micro-image includes one or more edges of one or more objects within the micro-image, and wherein the one or more objects include text,
applying bi-level encoding to the filtered micro-image to generate an encoded micro-image, and
generating the transaction hash pattern from the entire encoded micro-image;

identifying a first filter to be applied to the transaction image based on the mapping, wherein identifying the first filter to be applied to the transaction image based on the mapping comprises determining that the transaction hash pattern sufficiently matches a first hash pattern mapped to the first filter;
providing a filtered transaction image using the first filter;
determining text data from the filtered transaction image; and
executing the transaction with the determined text data from the filtered transaction image.

14. The non-transitory computer-readable storage medium of claim 13, wherein the transaction hash pattern comprises a binary string.

15. The non-transitory computer-readable storage medium of claim 13, wherein the operations for determining that the transaction hash pattern sufficiently matches the first hash pattern mapped to the first filter comprise calculating a Hamming distance between the transaction hash pattern and the first hash pattern, and comparing the Hamming distance to a threshold Hamming distance.

16. The non-transitory computer-readable storage medium of claim 13, wherein determining text data is performed by optical character recognition (OCR) of the filtered transaction image.

17. The non-transitory computer-readable storage medium of claim 13, wherein the transaction is to deposit a negotiable instrument at a financial institution.

* * * * *